US011251577B2

(12) United States Patent
Schauer

(10) Patent No.: US 11,251,577 B2
(45) Date of Patent: Feb. 15, 2022

(54) ARRANGEMENT APPARATUS FOR RECEIVING AND ARRANGING WIRE SECTIONS

(71) Applicant: SW AUTOMATISIERUNG GMBH, Galling an der Salzach (AT)

(72) Inventor: Johannes Schauer, Kuchl (AT)

(73) Assignee: SW AUTOMATISIERUNG GMBH, Golling an der Salzach (AT)

( * ) Notice: Subject to any disclaimer, the term of this patent is extended or adjusted under 35 U.S.C. 154(b) by 154 days.

(21) Appl. No.: 16/555,570

(22) Filed: Aug. 29, 2019

(65) Prior Publication Data

US 2019/0386448 A1 Dec. 19, 2019

Related U.S. Application Data

(63) Continuation of application No. PCT/AT2018/060058, filed on Mar. 6, 2018.

(30) Foreign Application Priority Data

Mar. 14, 2017 (AT) .............................. A 50202/2017

(51) Int. Cl.

*B23P 19/00* (2006.01)
*H01R 43/28* (2006.01)
*H01R 11/11* (2006.01)

(52) U.S. Cl.

CPC .............. *H01R 43/28* (2013.01); *H01R 11/11* (2013.01); *Y10T 29/532* (2015.01)

(58) Field of Classification Search

CPC ....... B65B 13/16; H01R 4/4818; H01R 11/11; H01R 13/33; H01R 9/16; Y10T 29/49123;

(Continued)

(56) References Cited

U.S. PATENT DOCUMENTS 4,415,765 A 11/1983 Iwasa et al.
5,127,159 A * 7/1992 Kudo ..................... H01R 43/20 29/564.4
5,208,977 A * 5/1993 Ricard ................. G02B 6/3833 29/861

(Continued)

FOREIGN PATENT DOCUMENTS

DE 34 32 334 3/1986
DE 42 24 194 1/1994

(Continued)

OTHER PUBLICATIONS

International Search Report dated May 29, 2018 in International (PCT) Application No. PCT/AT2018/060058.

(Continued)

*Primary Examiner* — Thiem D Phan

(74) *Attorney, Agent, or Firm* — Wenderoth, Lind & Ponack, L.L.P.

(57) ABSTRACT

A fabrication apparatus for the fabrication or prefabrication—preferably in an automated or semi-automated manner—of individual wire sections, comprising at least one arrangement apparatus for receiving and arranging a plurality of individual wire sections, in particular prepared wire sections from the fabrication apparatus, wherein the at least one arrangement apparatus comprises a main body and an arrangement section for receiving the wire sections, wherein the arrangement section is designed to string a plurality of individual wire sections through a gap that extends along the base body and along said gap, wherein the at least one arrangement apparatus can be attached to the fabrication apparatus in a releasable manner.

18 Claims, 6 Drawing Sheets

(58) Field of Classification Search
CPC ........................ Y10T 29/49098; Y10T 29/514; Y10T 20/532
USPC ...... 29/745, 33 M, 33 F, 747, 748, 753, 754, 29/759, 760, 857, 861, 863
See application file for complete search history.

(56) References Cited

U.S. PATENT DOCUMENTS

| | | | |
|---|---|---|---|
| 5,660,408 | A | 8/1997 | Johnson |
| 5,852,958 | A | 12/1998 | Araki |
| 6,249,636 | B1 | 6/2001 | Daoud |
| 8,903,216 | B2 | 12/2014 | Thompson et al. |
| 9,979,143 | B2 | 5/2018 | Renggli et al. |
| 2012/0230646 | A1 | 9/2012 | Thompson et al. |
| 2016/0181740 | A1 | 6/2016 | Renggli et al. |

FOREIGN PATENT DOCUMENTS

| | | | |
|---|---|---|---|
| DE | 19756978 | * 12/1997 | ............. H01R 43/20 |
| DE | 197 56 978 | 9/1999 | |
| DE | 20 2008 000 707 | 6/2009 | |
| EP | 0 038 861 | 11/1981 | |
| EP | 0 231 755 | 8/1987 | |
| EP | 0 782 223 | 7/1997 | |
| EP | 3 035 452 | 6/2016 | |
| GB | 2 352 097 | 1/2001 | |
| JP | 55-22887 | 6/1980 | |
| JP | 7-42076 | 7/1995 | |
| JP | 9-182233 | 7/1997 | |
| JP | 2016-115667 | 6/2016 | |
| KR | 10-2015-0042518 | 4/2015 | |
| RU | 2 575 861 | 2/2016 | |
| RU | 2 595 645 | 8/2016 | |

OTHER PUBLICATIONS

Search Report dated Jul. 24, 2017 in Austrian Application No. A 50202/2017.

* cited by examiner

ARRANGEMENT APPARATUS FOR RECEIVING AND ARRANGING WIRE SECTIONS

BACKGROUND OF THE INVENTION

The invention concerns a fabrication apparatus for fabrication or prefabrication of individual wire portions, comprising at least one organization apparatus for receiving and organizing a plurality of individual wire portions, and a use of such a fabrication apparatus.

Organization apparatuses of the above-indicated kind are already part of the state of the art and are provided for example by adhesive strips, fabric strips, wires or the like, which bind the wires together in strung-together relationship in the desired sequence. Organization systems which disclose arranging the wires or wire portions in a row by means of another wire or a similar medium are disclosed for example in EP 0038861 A1. The wire portions can be separated from the organization apparatus and fitted in accordance with their sequence into for example a switching cabinet or a similar item of equipment. The operation of arranging the wires in a row and connecting them however is linked to an increased amount of work. If that procedure is carried out in automated fashion complex apparatuses are necessary to do that. In addition, the fact that the wires are strung together in a row by means of adhesive strips, fabric strips, wire or another medium means that waste is involved, which has to be disposed of after the wires have been installed.

A further organization system is disclosed for example in Japanese Utility Model specification JP55022887 B. The operation of removing the individual wires from such an organization apparatus often manifests itself as being laborious. The connecting elements have to be undone in order to be able to remove the individual wires or tools are required for that purpose. In addition those connecting elements which act as the organization apparatus can generally only be used once. Arranging the wires in rows in an automated procedure by way of such organization systems is also highly complex.

SUMMARY OF THE INVENTION

The object of the invention is to avoid the above-described disadvantages and to provide a fabrication apparatus which is improved over the state of the art and the use of an improved fabrication apparatus.

If the organization portion is provided by a gap extending along the main body for threading a plurality of individual wire portions along the gap then the prefabricated wire portions can be inserted along the organization apparatus in succession as they are required at their future location of assembly. The organization apparatus accommodates the wire portions and can be transported from one place to another. In that case the organization portion prevents the sequence of the wire portions changing. This ensures that at the place of use, where the wire portions have to be installed, the individual wire portions are in the correct sequence. The organization portion in the form of the gap ensures that even different wire portions of differing lengths and with different ends or terminations can be accommodated. The individual wire portions arranged in row are of substantially the same cross-section. At one end of the wire portion however there is a wire termination which prevents the wire portion from slipping out of the gap. In that way for example a plurality of individual wire portions of the same cross-section of for example 0.75 $mm^2$ can be threaded on along an organization apparatus. Disposed at the ends of the wire portions there is a wire termination, for example in the form of a wire end ferrule, a cable shoe, a flat plug or a comparable element. It is however also possible to fit a cable support sleeve, a securing ring or something similar on the wire portion to prevent it from sliding out of the gap.

Basically, it is to be stated that a wire portion can involve various elements. The term wire portion is used to denote for example multi-core or single-core wires or cables with sheathing, individual insulated or bare wires, cable looms, finished cable harnesses, stranded wires, glass fiber cables or the like.

If the main body is provided by a bar profile having a longitudinal extent and the gap extends along the longitudinal extent, that then affords a compact and stable organization apparatus. It is particularly advantageous if in that case the main body is provided by a hollow chamber profile member. A hollow chamber profile member has a high level of stability. In addition for example protection for the wire terminations is ensured, as they are disposed in the interior of the hollow chamber profile member. That is also achieved by the gap connecting a first surface to a second surface of the main body. The first surface can be for example the outside of the hollow chamber profile member while the second surface can be the inside of the hollow chamber profile member. If no hollow chamber profile member is used, but a normal strip profile member having a gap, then the first and second sides are only afforded by two mutually oppositely disposed surfaces of the flat profile member.

If the gap has two distal ends, wherein the first end has an insertion device for insertion of the individual wire portions and the second end has an abutment portion for abutment engagement of the wire portions then the operation of threading in the wire portions is facilitated. The abutment prevents the wire portions from dropping out of the gap. The insertion device can be afforded by a funnel-shaped mouth opening into the gap to facilitate manual insertion or automated insertion. That funnel-shaped mouth opening can be afforded by concave recesses which continue in the gap. A funnel configuration with inclined straight lines which open into the gap however can also provide a mouth opening of that kind.

If the abutment portion is provided by a closure of the gap and/or a fold on the main body a simple structural measure provides the advantage that upon transport or when equipping the organization apparatus with the wire portions, they cannot slip out of the gap. The abutment portion can also achieve compact packing of the plurality of individual wire portions. They can be supported for example in a state of being pressed against each other along the gap.

It has proven to be particularly advantageous in that respect if at least one closure device is arranged at at least one end of the organization portion, by which closure apparatus the individual wire portions can be prevented from sliding out of the organization portion. That closure device, after the organization apparatus has been fitted with wires, prevents individual or all wire portions from being able to drop out of the apparatus. That is achieved for example in that the closure device is provided by a locking element which at least portion-wise covers the gap and which is arranged supported moveably on the main body. In that way the closure device can be in the form of a kind of flap or a lock which can be manually or automatically closed after the organization apparatus has been fitted with wires. Instead of the locking element which is arranged supported moveably on the main body however it is also possible to use an additional element which is pushed over the gap or inserted into the gap.

If the main body is provided by a square hollow profile member which is longitudinally slit at one side, wherein at least one end of the square hollow profile member remains open for threading in the individual wire portions and the other end of the square hollow profile member is at least portion-wise closed in order for example to form an abutment, then the wire terminations are supported protected by the hollow profile member in the interior of the organization apparatus. The wire portions cannot drop out upwardly by virtue of the closed shape of the organization apparatus as the gap has a kind of roof covering by virtue of the hollow profile member. In addition, the square hollow profile member also affords a compact structure, a stable main body and thus an organization apparatus which is simple to transport. It can also be used a plurality of times and does not have to be disposed of after one use.

An organization apparatus which has proven to be particularly advantageous has a plurality of individual wire portions, in particular prepared wire portions from a fabrication apparatus, which has the feature that the gap has a minimum gap width corresponding substantially to a wire diameter of the individual wire portions and a maximum gap width smaller than the termination diameter of the at least one wire termination arranged on the wire portion. That dimensioning of the gap width ensures that the wire portions can be smoothly threaded on along the organization apparatus. The larger diameter of the wire terminations arranged on the wire portions prevents them from falling out of the gap. The gap width does not have to be too great in that respect as otherwise it is no longer possible to ensure that the sequence of the wire portions in the organization apparatus changes.

When dealing with a plurality of individual wire portions which at least portion-wise do not have any insulation and thus form a stranded wire reference is then made to partial stripping in respect of those wire portions. That partial stripping in which the wire portion does not have any insulation can also be used for supporting the wire portion by virtue of the gap being of a minimum gap width which substantially corresponds to a strand diameter of the stripped portion of the individual wire portions and a maximum gap width which is smaller than the wire diameter of the insulated wire portion. When using the partially stripped wire portion at the location of assembly, it is for example simply pulled only orthogonally out of the gap. In that case the insulation is removed by the counteracting support action of the gap and the wire portion is completely stripped of insulation at the contact location.

It is generally advantageous if the connection between the plurality of individual wire portions and the organization apparatus is a positively locking connection. Introduction of the wire portions into the organization apparatus, or also removal of the wire portions, is simple and uncomplicated. The positively locking connection however ensures that the wire portions cannot drop out of the gap. Accordingly they are retained in the desired sequence in the organization portion.

It is provided that the organization apparatus can be releasably attached to the fabrication apparatus. That is fitted on to the fabrication apparatus for example by holding means, after the organization apparatus is filled it can be simply removed from the fabrication apparatus and transported to the location of use. After the assembly operation is concluded the empty organization apparatus can be transported back again and fitted to the fabrication apparatus again for filling. There is no wastage and there is a saving of resources as the organization apparatus is intended for multiple uses.

If there is provided a transfer device for transfer of the individual prefabricated or fabricated wire portions from the fabrication apparatus into the at least one organization apparatus on the fabrication apparatus, then automated production and organization of the individual wire portions can be implemented. The transfer device takes the individual fabricated wire portions and depending on the respectively desired sequence fits them to the individual organization apparatuses. The transfer device can be implemented for example by a robot which takes various wire portions from various fabrication apparatuses and arranges them in succession in accordance with the desired sequence in at least one organization apparatus. By way of example three different fabrication apparatuses produce three different wire portions. They have to be fitted in orderly arrangement in an organization apparatus in a predetermined sequence. The robot which serves as the transfer device takes the respective wire portion from the respective fabrication apparatus, in accordance with the respective predetermined sequence, and transfers it to the corresponding organization apparatus.

It can also be the case that there is provided an advance device for pushing the individual wire portions along the organization apparatus, thereby ensuring that the wire portions can be completely received by the organization apparatus. That can also be achieved by the transfer device and the advance device being formed by a single device, for example by a robot. The advance device however can also be formed for example by a conveyor belt, a vibrator, an air nozzle or some other component.

It has however proven to be particularly advantageous if the at least one organization apparatus is so arranged at the fabrication apparatus that the longitudinal extent of the main body and the gap extending therein are disposed inclinedly relative to the horizontal plane, whereby gravitationally induced downward sliding movement of the wire portions along the gap can be achieved—preferably to the abutment portion or to the nearest wire portion. Therefore there is no longer a need for an advance device as the force of gravity provides the necessary force for suitably positioning the wire portions. The inclined positioning of the individual organization apparatuses also saves on space as the reach thereof does not extend so far from the fabrication apparatus, as in a horizontally oriented state.

The use of a fabrication apparatus with at least one organization apparatus for orderly receiving a plurality of individual wire portions from the fabrication apparatus thus affords many economic advantages like for example: faster production by virtue of simpler fitment and arrangement of the wire portions, re-usability of the organization apparatus, a guaranteed orderly arrangement or sequence of the wire portions, a protected wire termination and a lower error rate in producing the sequence.

BRIEF DESCRIPTION OF THE DRAWINGS

Further details and advantages of the present invention are described more fully hereinafter by means of the specific description with reference to the embodiments by way of example illustrated in the drawings. In the drawings.

DETAILED DESCRIPTION OF THE INVENTION

Figure 1:
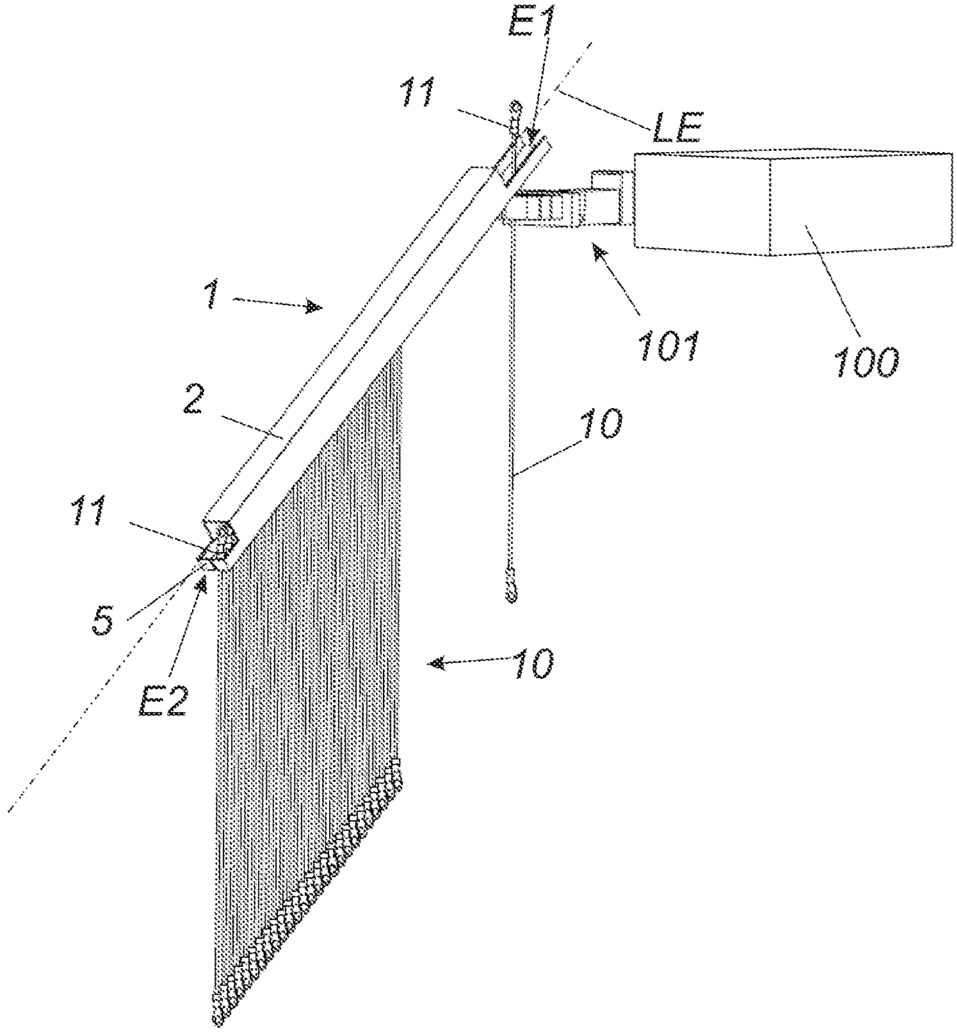
FIG. 1 shows a fabrication apparatus with an inclined organization apparatus.

FIG. 1 shows a diagrammatically illustrated fabrication apparatus 100. Disposed at the fabrication apparatus 100 is a diagrammatically illustrated transfer device 101 which for example can also be in the form of a robot arm. The individual prefabricated wire portions 10 with the wire terminations 11 arranged thereon pass from one or more fabrication apparatuses 100 through the transfer device 101 to the first end E1 of the organization apparatus 1 and are there fitted into the gap 4 (not visible in FIG. 1) of the organization portion 3 (shown in FIG. 3). By virtue of the inclined positioning of the organization apparatus 1 the wire portion 10, by virtue of the protrusion formed by the wire termination 11, slides along a longitudinal extent (longitudinal axis) LE of the organization apparatus 1 until reaching the abutment portion 5 or the next wire portion 10. In that case the abutment portion 5 is disposed at the second end E2 of the organization apparatus 1. The organization apparatus 1 includes a main body 2 having a rectangular cross-section and formed of a hollow profile member. It can be seen that the wire terminations 11 at the upper end of the wire portions 10 are protected by the closed shape of the organization apparatus 1. The wires are also prevented from sliding out upwardly by virtue of the closed structure of the main body 2. This therefore ensures that all wire portions 10, after fitment to the organization apparatus 1, are retained in their sequence and in the number thereof in the organization apparatus 1.

Figure 2:
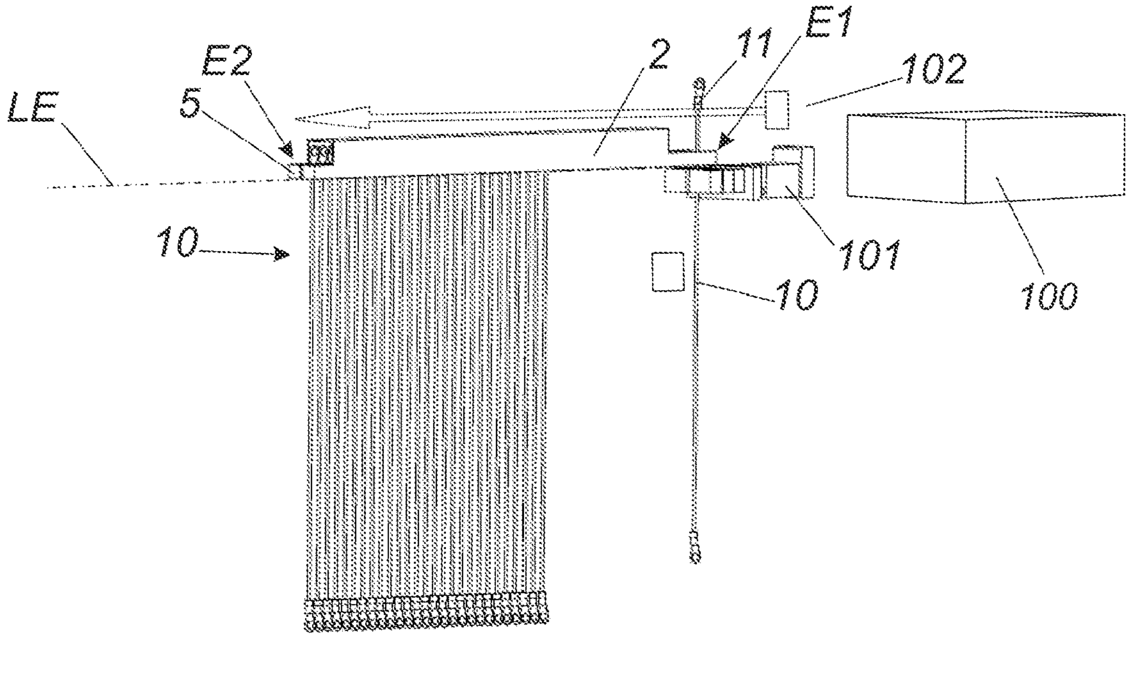
FIG. 2 shows a fabrication apparatus with a straight organization apparatus.

FIG. 2 shows a further variant of a diagrammatically illustrated fabrication apparatus 100, but there can also be provided a plurality of fabrication apparatuses 100. The transfer device 101 removes the respective wire portions 10 and inserts them at the first end E1 of the organization apparatus 1. An advance device 102 provides for the necessary advance movement along the longitudinal extent LE of the organization apparatus 1 towards the abutment portion 5 at the second end E2 or to the next wire portion 10 which was previously inserted. It can naturally also be provided that the transfer device 101 and the advance device 102 are formed by only one device. That could be for example a robot having a gripper. The angle at which the organization apparatus 1 is disposed in that case relative to the fabrication apparatus 100 is not crucial in terms of the function of introducing the individual wire portions 10 as the advance movement of the individual wire portions 10 is effected by the advance device 102 and not by gravity. Accordingly the organization apparatus 1 can be arranged for example facing inclinedly upwardly, oriented horizontally, facing inclinedly downwardly or at any other angle.

Figure 3:
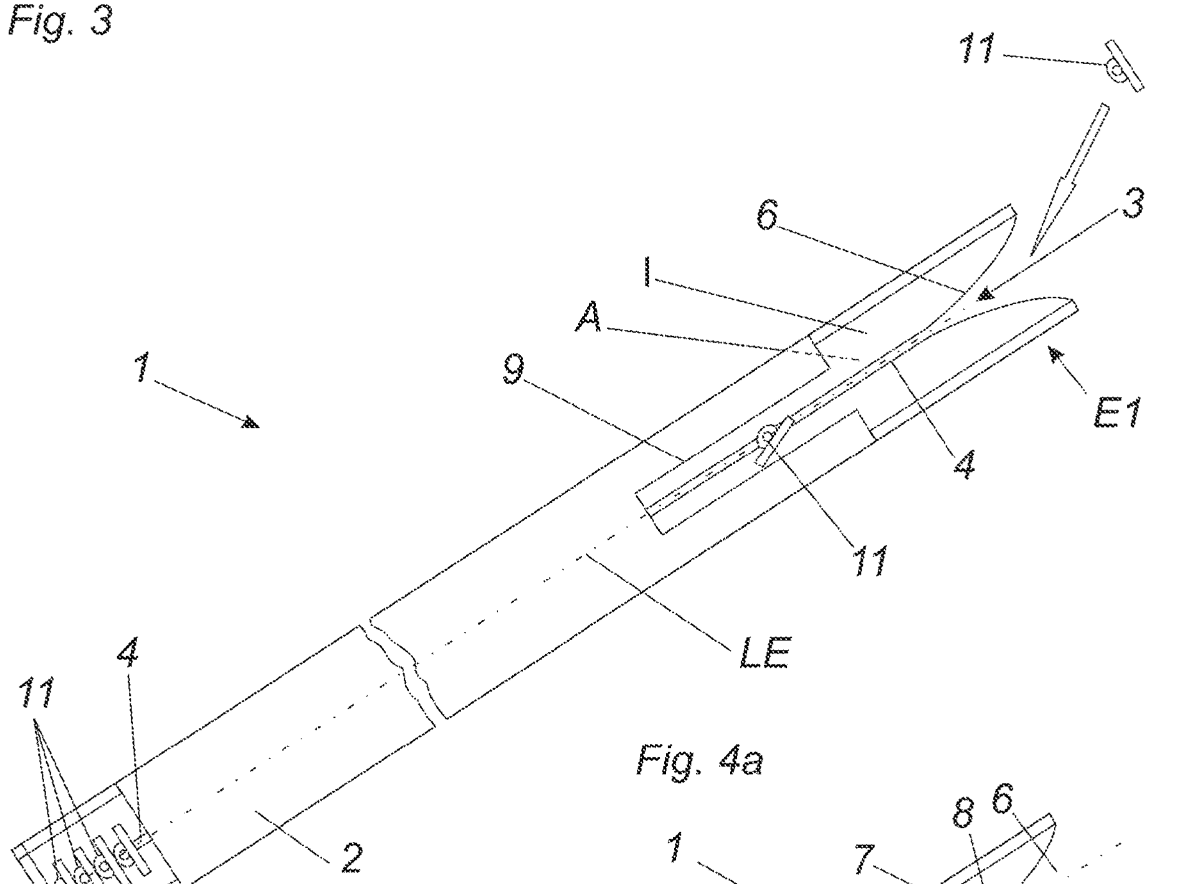
FIG. 3 is a plan view of the organization apparatus.

FIG. 3 shows the organization apparatus 1 with its longitudinal extent LE, along which the organization portion 3 is provided. Disposed at the second end E2 is the abutment portion 5 while disposed at the first end E1 is the funnel-shaped insertion portion 6. The insertion portion 6 opens into the gap 4. That facilitates insertion of the wire portions 10 with the wire terminations 11 mounted thereto. The main body 2 forms an inside I and an outside A. A part of the main body 2 above or in opposite relationship to the gap 4 was opened up to simplify insertion of the wire portions 10, that opened-up configuration being provided by the cut-out recess 9. The main body 2 is preferably formed by a metal profile member. That stable configuration permits multiple use of the organization apparatus 1. Instead of automated wire fabrication it is also possible to implement manual fabrication, in that case transfer to the organization apparatuses 1 is also effected for example manually or by a transfer device 101.

Figure 4A:
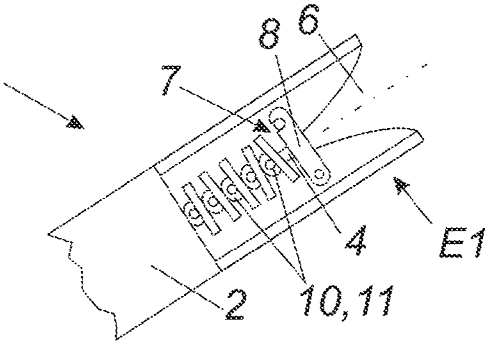
FIGS. 4*a* through 4*c* show variants of closure devices.

FIG. 4*a* shows a closure device 7 formed by a locking element 8. That is arranged rotatably on the main body 2 and engages into a locking pin. After the organization apparatus 1 is filled that locking element 8 can be closed to prevent the individual wire portions 10 from falling out.

Figure 4B:
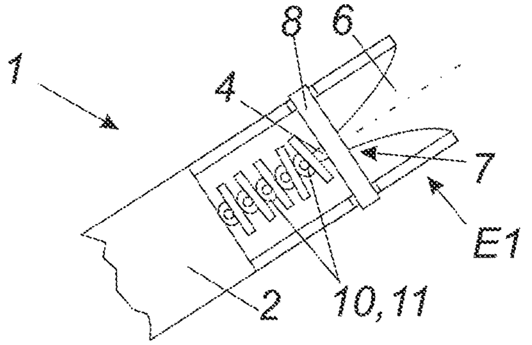

FIG. 4*b* shows another variant of a locking element 8 which is used as a closure device 7. In this case an elastic band, preferably a rubber ring, is pushed on to the main body 2. Recesses on the main body 2 can additionally secure the position of the locking element 8. The rubber band engages for example into slots in order to be able to prevent the rubber ring from accidentally slipping off.

Figure 4C:
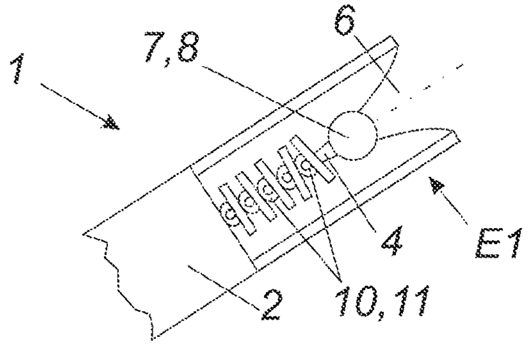

FIG. 4*c* shows a further variant of the locking element 8 which serves as a closure device 7 for the gap 4. That can be a shaped portion, for example in the form of a plug or something similar, which is connected in positively locking relationship to the gap 4 or the insertion portion 6.

Figure 5A:
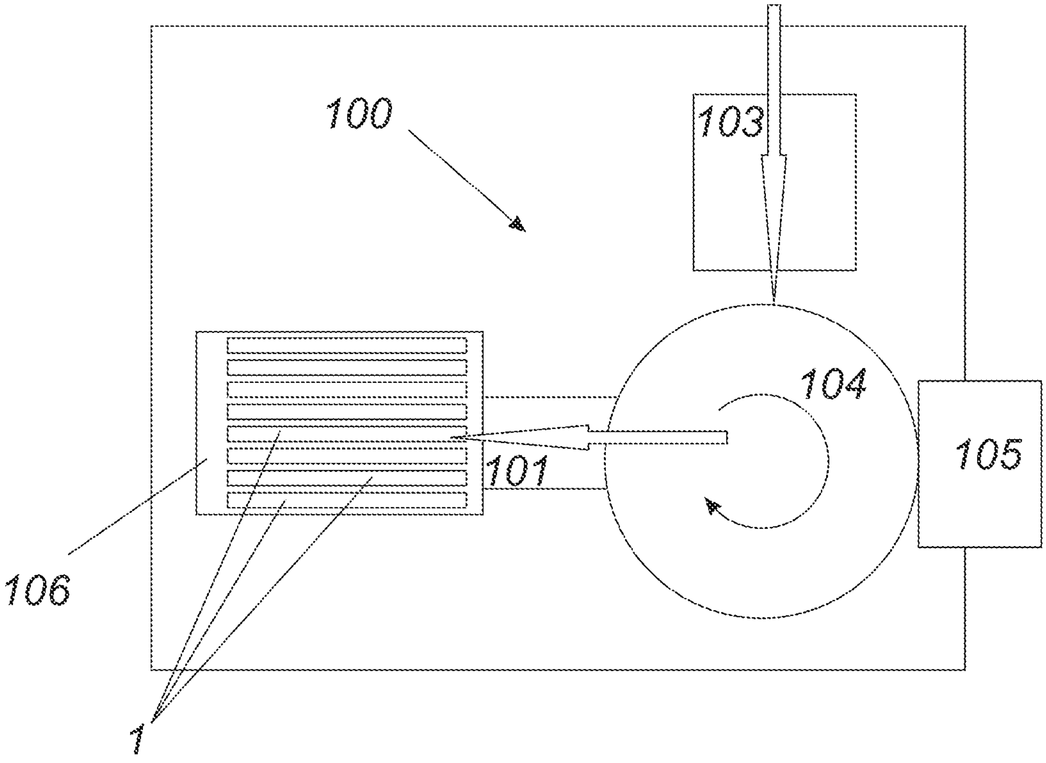
FIGS. 5*a* and 5*b* show a diagrammatic representation in different views of the arrangement of a fabrication apparatus and at least one organization apparatus.

FIG. 5*a* shows a plan view of a diagrammatically illustrated fabrication apparatus 100 comprising a feed portion 103 which transfers the wire portion 10 or the wire terminations 11 to be fitted to the wire portion 10 to a preparation portion 104. The processing portion 105 fabricates the wire portions 10. For that purpose for example the wire is cut to length, stripped of insulation, partially stripped, crimped to wire portions 11, or pressed, soldered, glued or shrunk. The prefabricated wire portions 10 pass by way of the transfer device 101 into the organization apparatuses 1 provided for same or into the organization apparatus 1 provided for same. They are disposed in the removal portion 106 on the fabrication apparatus 100.

Figure 5B:
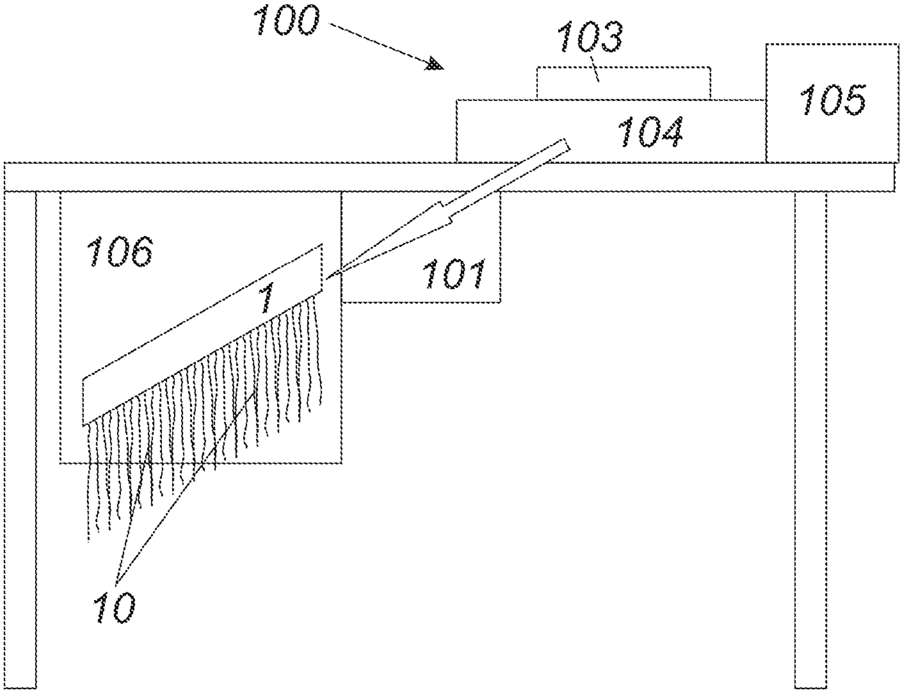

FIG. 5*b* shows the diagrammatic structure as a side view. In that respect it can be seen that the plurality of organization systems 1 or a single organization system 1 are oriented inclinedly relative to the horizontal axis to cause the wire portions 10 to slide along under the force of gravity. The angle between the longitudinal extent LE and the horizontal axis is in a range of between 0° and 90°, particularly preferably between 10° and 80°.

Figure 6A:
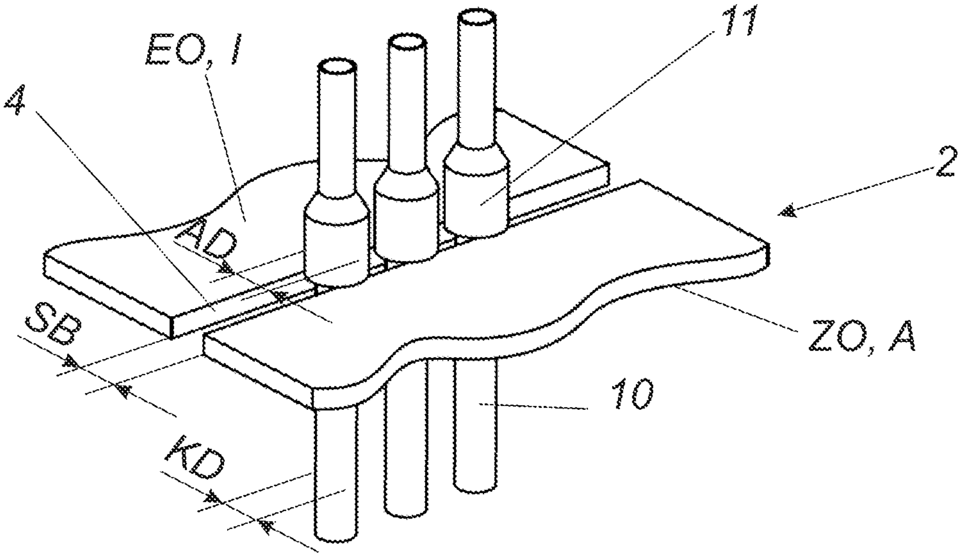
FIGS. 6*a* and 6*b* are different views of the gap dimensioning.
Figure 6B:
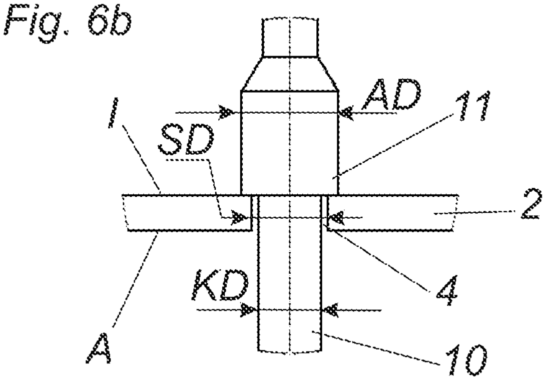

FIG. 6*a* shows the dimensioning of the gap width SB in relation to the dimensioning of the wire diameter KD of the individual wire portions 10. The figure also shows how the wire terminations 11 are prevented from slipping through the gap 12 by virtue of the protrusion thereof beyond the gap width SB. The wire terminations 11 rest in positively locking relationship at a first surface EO or also the inside I of the main body 2. At the oppositely disposed second surface ZO or also the outside A the wire portions 10 project from the gap 4. The gap width SB substantially corresponds to the diameter KD of the individual wire portions 10. For simplification and improvement of the sliding properties along the gap 4 however it is provided that a certain oversize in wire diameter at the gap width SB is afforded. The gap width SB however does not exceed the value of the diameter of the wire termination 11. Accordingly the gap width SB is equal to the wire diameter KD or less than the termination diameter AD. That is also clearly shown in FIG. 6*b*, showing the detail from FIG. 6*a*.

Figure 7A:
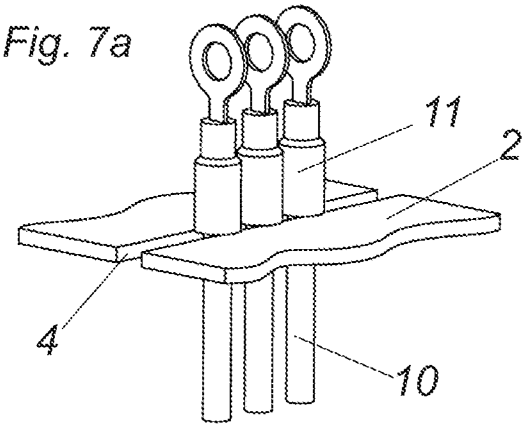
FIGS. 7*a* through 7*c* show different variants of wire terminations arranged in a gap.
Figure 7B:
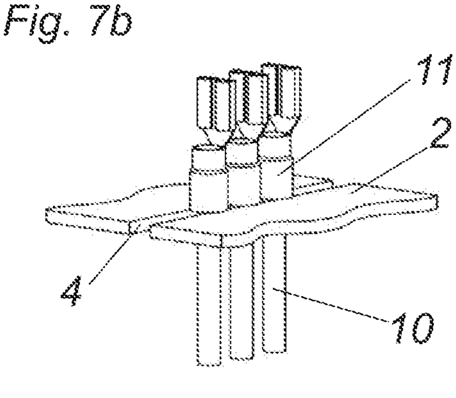
Figure 7C:
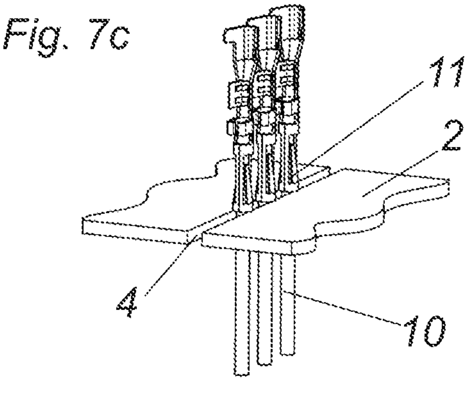

FIGS. 7*a* through 7*c* show different variants of wire terminations 11, FIG. 7*a* showing cable shoes, FIG. 7*b* showing the female contact elements of flat plugs and FIG. 7*c* showing crimp contacts. Instead of such wire terminations shown on the examples in FIGS. 7*a* through 7*c* however any other elements like for example shrink hoses, cable splice joins, cable bushings or the like can serve as the wire termination 11. What is important is that the protrusion formed by the wire terminations 11 is greater than the gap width SB (see FIG. 6*b*).

Figure 8:
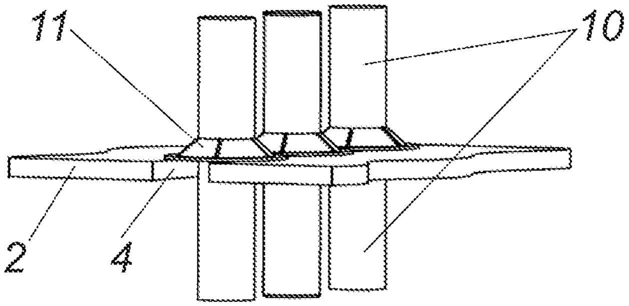
FIG. 8 shows a wire termination provided by transport securing means.

FIG. 8 shows how wire portions 10 which have only been cut to length, without wire terminations 11 arranged thereon, in the form of an end sleeve or a similar contact element, can be supported along a gap 4. For that purpose transport securing means fitted on the wires serve as the wire termination 11. After removal of the wire portions 10 the transport securing means can be removed from the wire portion 10 or are removed automatically when the wire portion 10 is pulled out of the gap 4.

Figure 9A:
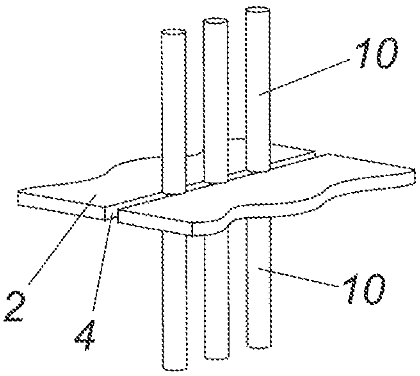
FIGS. 9*a* and 9*b* show partial stripping of a wire portion.
Figure 9B:
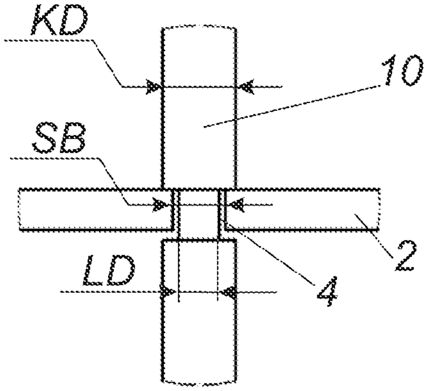

A further variant is shown in FIG. 9*a*, in this case partly stripped wire portions 10 are supported in the gap 4. That is shown in detail in FIG. 9*b* where the insulation of the wire portion 10 was severed, pushed along the strand core of the wire portion 10 and thus part of the core was exposed. The core diameter LD therefore serves as a reference for the gap width SB. In that case the gap width SB is either equal to the core diameter LD, but never greater than the wire diameter KD. If the wire portion 10 is required it is possible to pull on the longer piece thereof, which hangs out of the organization apparatus 1, in which case the partly detached at the short end and in the interior of the organization apparatus 1 comes off and the wire portion 10 can be used directly without being stripped. The wire portion however can be quite normally simply pushed out of the gap 4 if the partial stripping or the partial insulation is to be maintained.

Figure 10A:
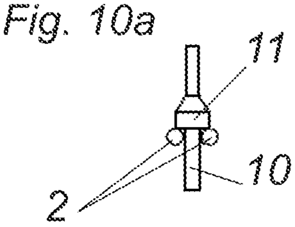
FIGS. 10*a* through 12*b* show different main body variants.
Figure 10B:
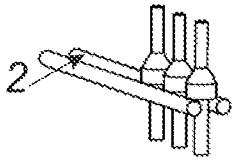

FIGS. 10*a* and 10*b* show different views of the main body 2. The main body 2 can be formed not only by a hollow chamber profile member or a flat profile member, but also by for example rod-shaped elements of circular cross-section, which are arranged in mutually parallel relationship.

Figure 11A:
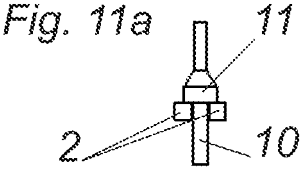
Figure 11B:
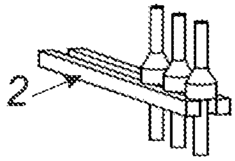

FIGS. 11*a* and 11*b* show how rectangular rod elements oriented in mutually parallel relationship form the main body 2.

Figure 12A:
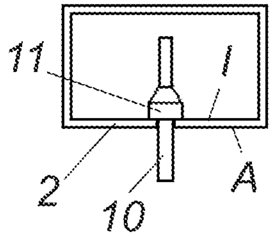
Figure 12B:
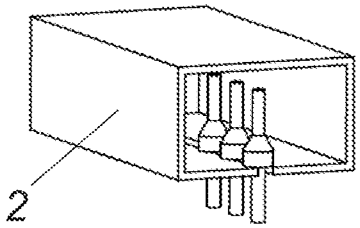

FIGS. 12*a* and 12*b* show the hollow profile member variants with rectangular profile bodies as the main body 2.

Figure 13A:
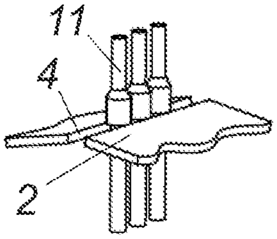
FIGS. 13*a* through 14*c* show different gap variants.
Figure 13B:
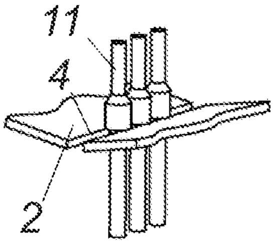
Figure 13C:
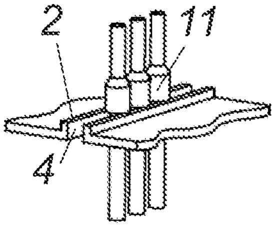
Figure 13D:
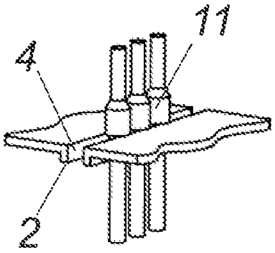

FIGS. 13*a* through 13*d* show different variants of the gap 4 on the main body 2. They are intended to simplify the individual wire portions 10 being threaded into or threaded out of the gap 4 or influenced in some other fashion. In that respect FIG. 13*a* shows a main body 2 which is arched in the direction of the wire terminations 11 and at the highest point of which the gap 4 is formed. FIG. 13*b* shows precisely the opposite, in this case the main body 2 is cambered downwardly, and the gap 4 is at the lowest part. FIG. 13*c* forms a leg which faces upwardly, while in FIG. 13*d* the leg faces downwardly. Those different structural variants can be used for example in relation to wire terminations 11 of different kinds in order to be able to protect them or embrace them according to the shape thereof.

Figure 14A:
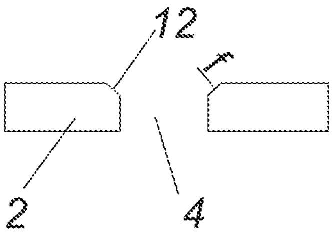
Figure 14B:
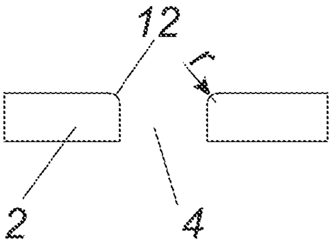
Figure 14C:
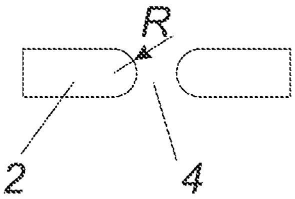

FIGS. 14*a* through 14*c* show different geometries of the gap 4. By way of example FIG. 14*a* shows the cross-section of the main body 2, through which the gap 4 extends. The transition from the main body 2 into the gap 4 can be formed in that case at the transitional portion 12 by a bevel F while FIG. 14*b* shows how the transitional portion 12 is formed by a radius r. FIG. 14*c* shows how the gap 4 connects both sides of the main body 2 by a rounded configuration of a radius R.

Figure 15:
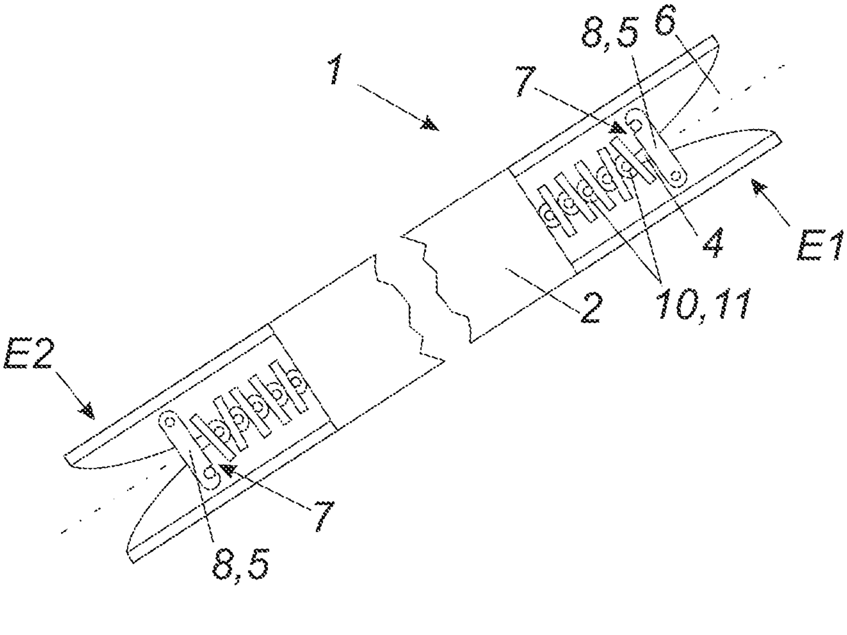
FIG. 15 shows an embodiment of an organization apparatus.

FIG. 15 shows a further variant of the organization apparatus 1. It includes at both ends E1 and E2 an insertion portion 6 and a respective locking element 8. That provides that in use of the organization apparatus 1 at the fabrication apparatus 100 it is not necessary to pay attention to the direction of insertion and thus the organization apparatus 1 can be filled from both ends E1 and E2 and subsequently can also be locked by the locking element 8. By virtue of this variant it is also possible to select from which of the two ends E1, E2 the wire portions 10 are removed, which can have an effect on the sequence thereof. Thus, when fitting the wire portions to the organization apparatus 1 it is possible to establish whether for example the first wire portion 10 introduced is also the first wire portion 10 to be removed, being required in the assembly procedure, or the last. In the situation where the first inserted wire portion 10 is also the first wire portion 10 to be installed and same was introduced at the end E1 then it also has to be removed at the end E1. If the sequence is different and the first inserted wire portion 10 is the wire portion 10 which is to be installed last, it has to be removed at the opposite end E2. In this variant the locking elements 8 at the same time form the abutment portion 5. Instead of the locking elements 8, as are shown in FIG. 15, it is also possible to use another locking element 8, for example a rubber band or a closure plug, as already shown in the preceding Figures.

The invention claimed is:

1. A fabrication apparatus for fabrication or prefabrication of individual wire portions, the fabrication apparatus comprising:

an organization apparatus for receiving and organizing a plurality of individual wire portions, the organization apparatus including a main body and an organization portion for receiving the individual wire portions; and a closure device arranged at at least one end of the organization portion, the closure device being configured to prevent the individual wire portions from sliding out of the organization portion, wherein the organization portion is formed as a gap extending along the main body for allowing the plurality of individual wire portions to be threaded along the gap, and the organization apparatus is releasably mountable to the fabrication apparatus.

2. The fabrication apparatus as set forth in claim 1, wherein the main body is formed by a rod profile member having a longitudinal axis, and the gap extends along the longitudinal axis.

3. The fabrication apparatus as set forth in claim 1, wherein the main body is a hollow chamber profile member.

4. The fabrication apparatus as set forth in claim 1, wherein the gap connects a first surface of the main body to a second surface of the main body.

5. The fabrication apparatus as set forth in claim 1, wherein the gap has two distal ends, wherein a first end of the gap has an insertion device for insertion of the individual wire portions, and a second end of the gap has an abutment portion for abutment engagement of the wire portions.

6. The fabrication apparatus as set forth in claim 5, wherein the insertion device is a funnel-shaped mouth opening into the gap.

7. The fabrication apparatus as set forth in claim 5, wherein the abutment portion is a closure of the gap and/or a fold on the main body.

8. The fabrication apparatus as set forth in claim 1, wherein the closure device is a locking element covering at least a portion of the gap and supported moveably on the main body.

9. The fabrication apparatus as set forth in claim 1, wherein the main body is a square hollow profile member longitudinally slit at one side, wherein a first end of the square hollow profile member is open to allow for threading in of the individual wire portions, and a second end of the square hollow profile member is at least partially closed.

10. The fabrication apparatus as set forth in claim 1, further comprising a plurality of individual wire portions each having at least one wire termination arranged thereon, wherein the gap has a minimum gap width corresponding substantially to a wire diameter of each of the individual wire portions and a maximum gap width smaller than the termination diameter of the at least one wire termination of each of the wire portions.

11. The fabrication apparatus as set forth in claim 10, wherein a connection between the plurality of individual wire portions and the organization apparatus is a positively locking connection.

12. The fabrication apparatus as set forth in claim 1, further comprising a plurality of individual wire portions which at least partially have no insulation so as to be a stranded wire, wherein the gap has a minimum gap width substantially corresponding to a stranded wire diameter of a portion of the individual wire portions having no insulation and a maximum gap width smaller than an insulated wire diameter of a portion of the individual wire portions having insulation.

13. The fabrication apparatus as set forth in claim 1, further comprising a transfer device for transferring the individual wire portions from the fabrication apparatus into the organization apparatus at the fabrication apparatus.

14. The fabrication apparatus as set forth in claim 13, further comprising an advance device for pushing the individual wire portions along the organization apparatus, wherein the transfer device and the advance device are combined to form a single device.

15. The fabrication apparatus as set forth in claim 1, wherein the organization apparatus is configured such that a longitudinal axis of the main body and the gap extending therein are inclined relative to a horizontal plane to produce gravitationally induced downward sliding movement of the wire portions along the gap.

16. The fabrication apparatus as set forth in claim 15, wherein the longitudinal axis of the main body and the gap are inclined relative to the horizontal plane to produce gravitationally induced downward sliding movement of the wire portions along the gap to the abutment portion or to the nearest wire portion.

17. A use of a fabrication apparatus as set forth in claim 1 for orderly arrangement of the plurality of individual wire portions in the organization apparatus, wherein the plurality of individual wire portions are arranged along the organization portion of the organization apparatus in a predetermined sequence.

18. A fabrication apparatus for fabrication or prefabrication of individual wire portions, the fabrication apparatus comprising:

a plurality of individual wire portions; and an organization apparatus for receiving and organizing the plurality of individual wire portions, the organization apparatus including a main body and an organization portion for receiving the individual wire portions, the organization portion being formed as a gap extending along the main body for threading the plurality of individual wire portions along the gap;

a plurality of individual wire portions which at least partially have no insulation so as to be a stranded wire, wherein the gap has a minimum gap width substantially corresponding to a stranded wire diameter of a portion of the individual wire portions having no insulation, and a maximum gap width smaller than an insulated wire diameter of a portion of the individual wire portions having insulation, wherein the organization apparatus is releasably mountable to the fabrication apparatus.

* * * * *